United States Patent [19]

Moriya

[11] Patent Number: 4,905,096
[45] Date of Patent: Feb. 27, 1990

[54] IMAGE READING ARRANGEMENT

[75] Inventor: Shigeru Moriya, Osaka, Japan

[73] Assignee: Minolta Camera Kabushiki Kaisha, Osaka, Japan

[21] Appl. No.: 236,933

[22] Filed: Aug. 26, 1988

[30] Foreign Application Priority Data

Aug. 28, 1987 [JP] Japan ................. 62-216227

[51] Int. Cl.[4] .................................. H04N 1/393
[52] U.S. Cl. .................... 358/451; 358/453; 382/47
[58] Field of Search .............. 358/481, 453; 382/47; 358/77

[56] References Cited

U.S. PATENT DOCUMENTS

| | | | |
|---|---|---|---|
| 4,614,977 | 9/1986 | Kawahara et al. | 358/451 |
| 4,771,473 | 9/1988 | Sugiura | 382/47 |
| 4,788,578 | 11/1988 | Tamura et al. | 358/451 |
| 4,833,544 | 5/1989 | Sato et al. | 358/451 |

Primary Examiner—Edward L. Coles, Sr.
Attorney, Agent, or Firm—Burns, Doane, Swecker & Mathis

[57] ABSTRACT

An image reading arrangement provided with an optical magnifying device and an electrical magnifying device which is so arranged that, in the case where the designated reading range can not be read by the designated magnification, even if the magnification is that which can be covered by the optical magnifying, the electrical magnifying device is also utilized for improved operability.

5 Claims, 9 Drawing Sheets

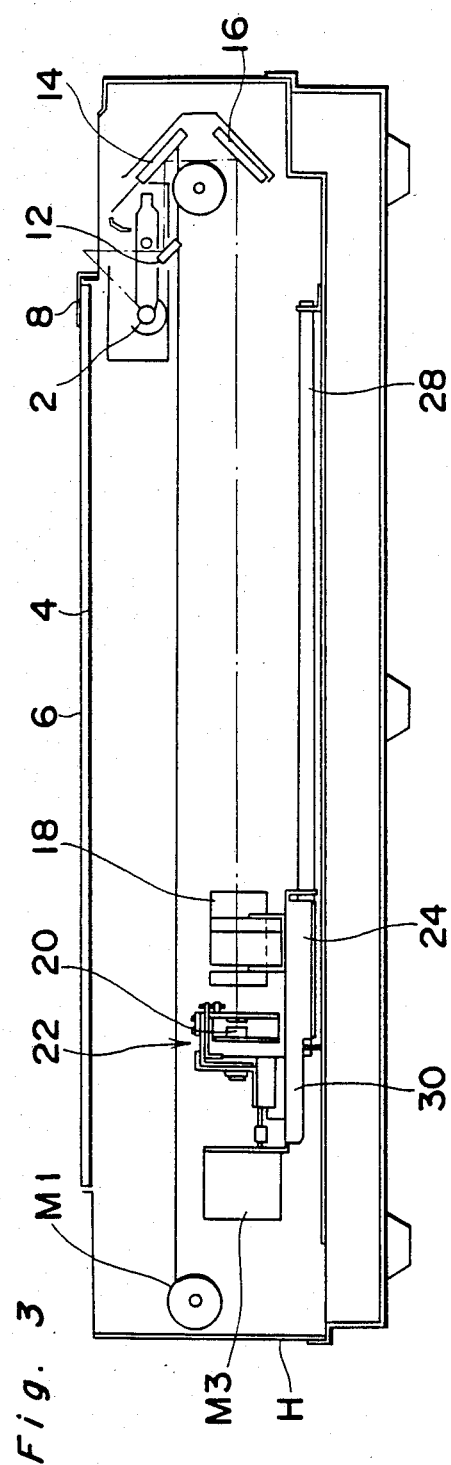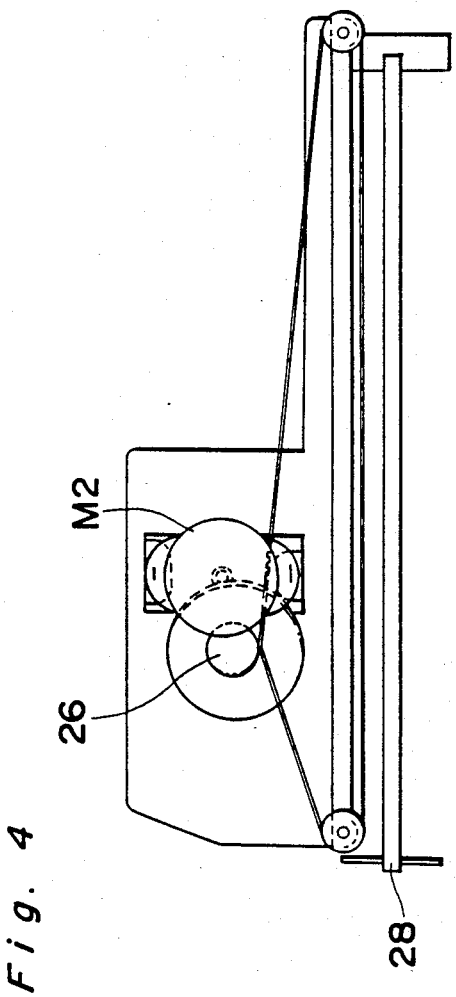

IMAGE READING ARRANGEMENT

BACKGROUND OF THE INVENTION

The present invention generally relates to an image reading apparatus, and more particularly, to an image reading apparatus provided with an enlarging or magnifying function.

Commonly, in a digital copying apparatus, digital color copying apparatus or the like, enlargement is an essential function indispensable thereto. Accordingly, an image reading arrangement for transmitting binary-coded data of an image to a digital copying apparatus, etc., is required to be provided with an enlarging or magnifying function.

The enlarging or magnifying system for the image reading arrangement may be broadly divided into an optical magnifying type and an electrical magnifying type. In the optical magnifying type, the optical system is provided with a zoom function so as to read the image through enlarging of an image of the original document incident upon an image pickup element, while in the electrical magnifying type, the data read at a fixed magnification (fixed resolution) is processed.

In the variation of magnification through electrical processing, it is possible in principle to adopt any desired magnification, without limitations in the upper or lower limit value thereof. In the magnification variation, particularly in the direction of enlarging, however, deterioration of images tends to take place, since data which is not read originally must be prepared in a pseudo practice. On the other hand, in the variation of magnification by the optical system, it may be regarded that deterioration of the image quality is almost nil, and accordingly, upon comparison of the optical magnifying with the electrical magnifying, the optical magnifying is advantageous in terms of image quality.

Meanwhile, a disadvantage in the adoption of the optical magnifying is that there may be formed portions which can not be read on the original document as described hereinbelow.

FIGS. 11(a) and 11(b) respectively show the relation between an original document and a CCD (charge coupled device) surface during an equal size or life size magnification and during enlargement. In the equal size magnification, the image on the entire surface of the original document (in a main scanning direction) is projected over the CCD surface as shown in FIG. 11(a), whereas during the enlarging, the image on the entire surface of the original document is not projected over the CCD surface as illustrated in FIG. 11(b). In other words, regions M and M' at opposite edges on the surface of the original document can not be read.

In the general enlarging operation (e.g., conversion from an A5 size original document into A4 size), no inconvenience is experienced in many cases, even if such unreadable portions are present.

However, in the case where the original document is of a maximum size for equal size reading, with a partial enlarging being required to be effected, there are cases where the region aimed at enters the unreadable region M or M'.

In the conventional practice, when the state as described above takes place, there is no other way than to displace the original document into the readable region by an operator. For such an editing work, it is frequently required to designate the enlarged reading region after monitoring by a monitor device such as a CRT and the like subsequent to once reading the whole image surface at an equal size magnification, thus resulting in necessity for the operator to displace the original document depending on adopted magnifications and regions, or in obstruction against smooth operation. Particularly, in the case where an automatic document feeder is employed, it is impossible for the operator to displace the original document to its position.

SUMMARY OF THE INVENTION

Accordingly, an essential object of the present invention is to provide an image reading arrangement which is provided with both optical magnifying and electrical magnifying functions for the improvement of magnifying power.

Another object of the present invention is to provide an image reading arrangement of the above described type which is simple in construction and stable in functioning.

In accomplishing these and other objects, according to one preferred embodiment of the present invention, there is provided an image reading arrangement which comprises an optical projecting mechanism for projecting an image of an original document, an image reading device for converting the projected image into an electrical image signal, a first magnifying means associated with said optical projecting mechanism for optically enlarging the size of the image to be projected onto said image reading device, a second magnifying means including a memory means for temporarily storing an electrical image signal and arranged to electrically enlarge the size of an image by controlling writing and reading of the image signal into and from said memory means, a magnification input means for inputting enlarging magnification when the size of the image of the original document is enlarged, a region input means for inputting data designating a region on the original document to be read and outputted, and a control means for controlling said first and second magnifying means in response to said magnification input means and said region input means, and said control means effects the control in such a manner that, when an entire region as designated can not be read if only said first magnifying means is operated at the input magnification, said control means sets magnification to be used in each of said first and second magnifying means so as to cause said first and second magnifying means to function simultaneously.

In the above arrangement of the present invention, the image reading arrangement provided with an optical magnifying means and an electrical magnifying means is so arranged that, in the case where the reading designated range can not be read by the designated magnification, even if the magnification is that which can be covered by the optical magnifying, the electrical magnifying means is also utilized. More specifically, in one aspect of the present invention, the optical magnifying is effected up to the limit at which the designated magnification can be read, and the remaining enlargement is electrically effected. In another aspect, if the designated region can not be optically read at the designated magnification, the optical magnifying is set at the equal size magnification, and the electrical enlarging is employed.

In both of the above two practices, if the designated region is within a range which can be covered by the optical enlargement, the optical magnifying is to be preferentially used.

BRIEF DESCRIPTION OF THE DRAWINGS

These and other objects and features of the present invention will become clear from the following description taken in conjunction with the preferred embodiments thereof with reference to the accompanying drawings, in which:

FIG. 3 is a side sectional view of an original document reading arrangement according to one preferred embodiment of the present invention;

FIG. 4 is a fragmentary top plan view of a lens displacing system employed in the arrangement of FIG. 3;

DETAILED DESCRIPTION OF THE INVENTION

Figure 1:
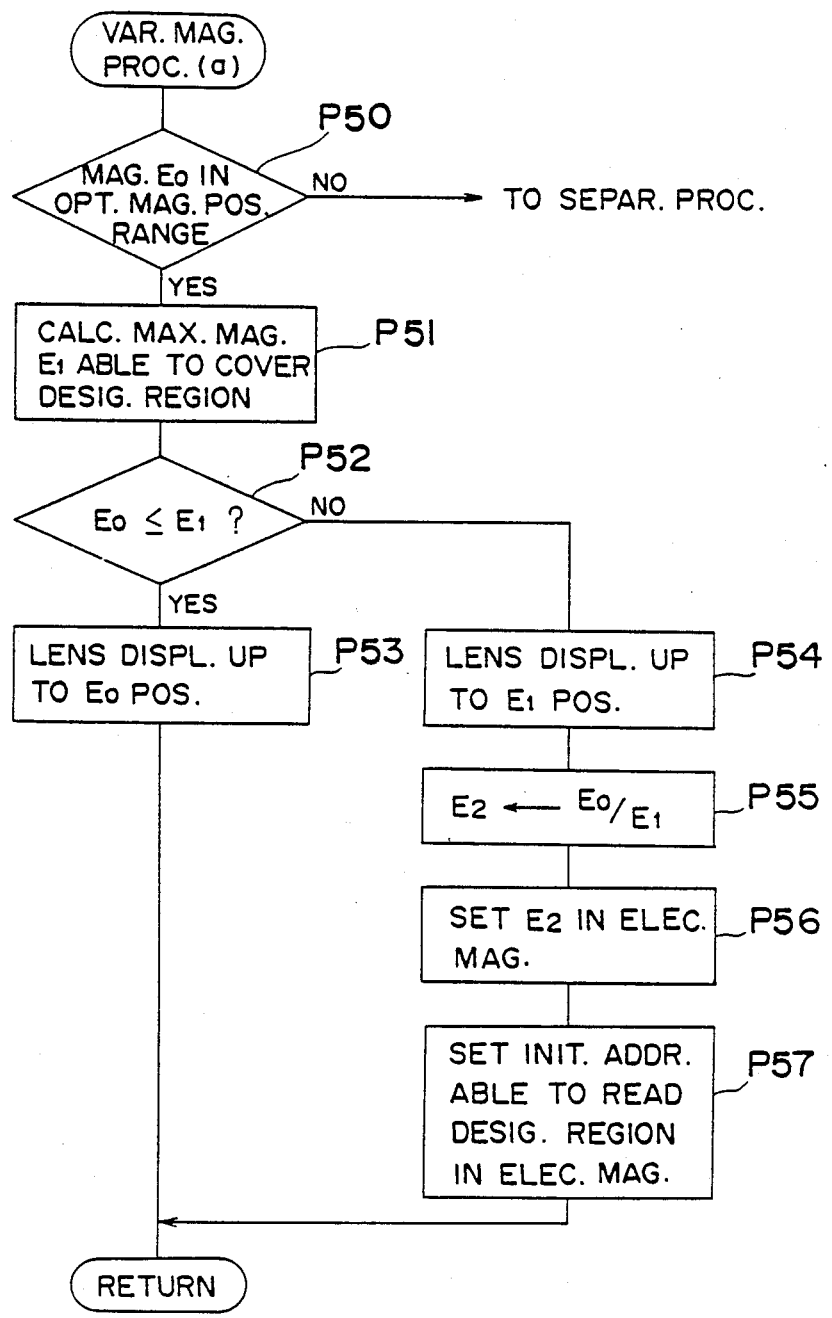
FIG. 1 is a flow-chart for explaining a variable magnification processing in an image reading arrangement according to one preferred embodiment of the present invention.

Before the description of the present invention proceeds, it is to be noted that like parts are designated by like reference numerals throughout the accompanying drawings.

Referring now to the drawings, one preferred embodiment of the present invention will be described hereinafter in the order as follows.

(1) Image reader
(2) Internal electrical construction of the image reader
(3) Main flow for variable magnification reading
(4) Variable magnification processing

(1) Image reader

In FIG. 3, there is shown an image reading arrangement or image reader according to one preferred embodiment of the present invention, which generally includes a housing H, an original document platform 4 of a light transmitting material such as glass or the like disposed at an upper portion of the housing H for placing an original document 6 thereon and having an original document scale or reference pattern 8 disposed along its one side edge, a halogen lamp 2 provided below and adjacent to the platform 4 for illuminating the original document 6, and an optical system including first, second and third mirrors 12, 14 and 16 for sequentially leading light reflected by the original document 6, through a lens assembly 18, to a one-dimensional CCD (charge coupled device) 20 as an image pickup device, which is supported by a CCD adjusting mechanism or CCD holder 22 for adjustment of its position and angle, with said CCD holder 22 and the lens assembly 18 being mounted on a movable table 24.

As shown in FIG. 4, adjustment of magnification is arranged to be effected by a magnification adjusting motor M2 coupled with a wire pulley 26 wound with a wire for displacing the moving table 24 back and forth in a direction of an optical axis along a zoom slide shaft 28, whereby a zoom magnification variation may be effected.

Focusing adjustment for adjusting deviation in the conjugate length due to the lens displacement may be effected by displacing the CCD 20 back and forth in the optical axis direction by a focusing adjusting motor M3 mounted on the movable table 24 through a focusing adjusting mechanism 30.

For the scanning of the original document 6, two sliders on which the light source 2 and the first, second and third mirrors 12, 14 and 16 are fixed, are displaced in the scanning direction by a motor M1 through a pulley and wire arrangement in a known manner.

(2) Internal electrical construction of the image reader

Figure 5:
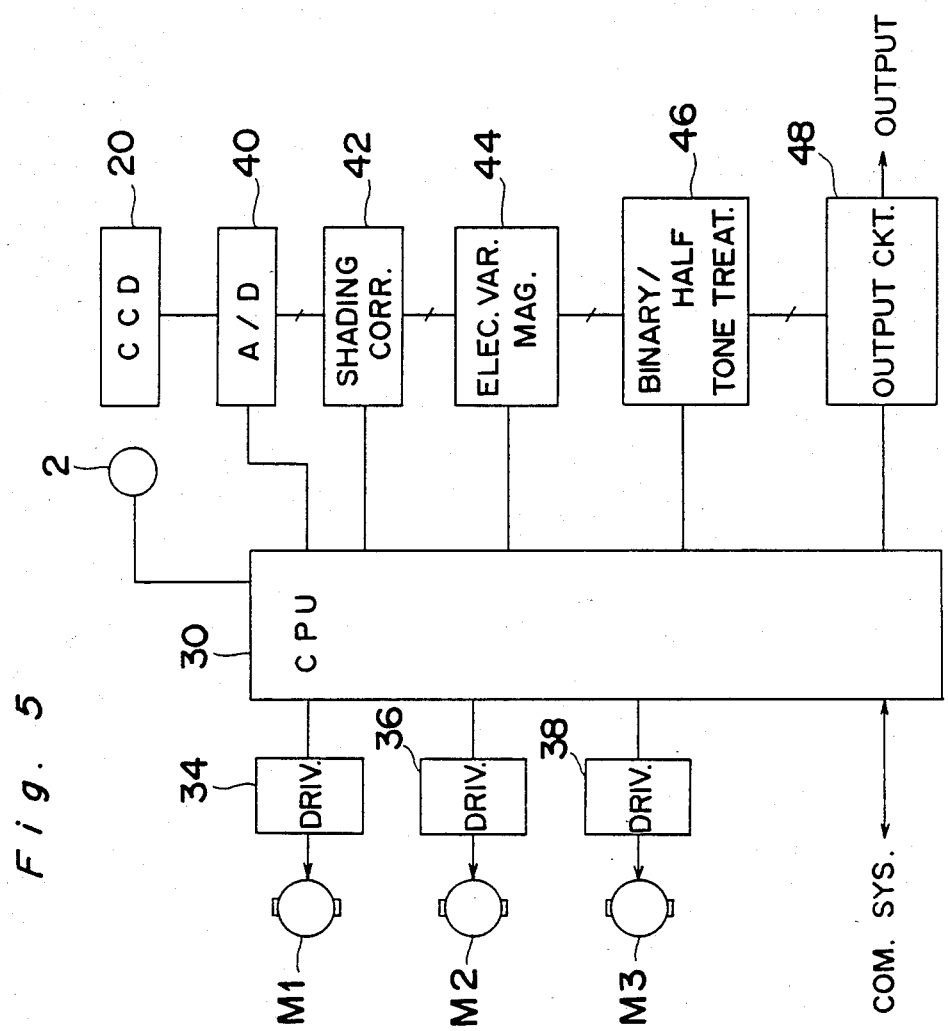
FIG. 5 is a schematic block diagram showing general internal construction of the original document reading arrangement.

FIG. 5 shows a schematic block diagram of a circuit for detecting density of the original document. The scan motor M1, lens motor M2 and focus adjusting motor M3, which are pulse motors, are respectively connected through pulse motor drivers 34, 36 and 38 to a CPU 30, which is coupled with the exposure lamp 2, the CCD 20 through an A/D converting section 40, a shading correction section 42, an electrical magnification varying section 44, a binary/half tone treating section 46, and an output circuit 48, etc.

To the CPU 30 for controlling reading of the original document, various input and output signals are connected through a communication system not particularly shown. The input signals include a dot density signal (e.g. 240, 300, 400 dots/inch) for setting resolution of a printer, a magnification signal for setting magnifications for image reading, a region signal for designating the region to be partially enlarged as represented by X-Y coordinates, and a start signal for starting reading function, etc., which are inputted through a control panel (not shown).

There are also included such signals as a lens position signal which is outputted when the lens assembly 18 is at the initial position, a slider predetermined position signal which is outputted when the slider is at the predetermined position, and an original document leading edge signal which informs that the slider is at the leading edge of the original document.

The scan motor M1, lens motor M2 and focus adjusting motor M3 are driven by the CPU 30 via the pulse motor drivers 34, 36 and 38 respectively.

An exposure lamp signal is also applied to illuminate the exposure lamp 2.

Light irradiated by the exposure lamp 2 and reflected from the original document is incident upon the CCD 20 through the optical system. The output signal of the CCD 20 is converted into a digital value of multiple bit form by the A/D converting section 40, and after being corrected for shading at the shading correction section 42, electrically varied in the magnification at the electrical magnification varying section 44. Thereafter, the signal is converted into a digital one bit signal from multiple bit form by the binary/half tone treating section 46, and is externally outputted (e.g. to an electrophotographic printer) through the output circuit 48. Each of the processing sections 40, 42, 44, 46 and 48 are applied with control signals from the CPU 30. Here, the signals such as those for the scanning function starting, selection of magnification to be varied, selection of the binary/half tone processings, etc. are applied to the CPU 30 through the communication system (not shown).

Figure 6:
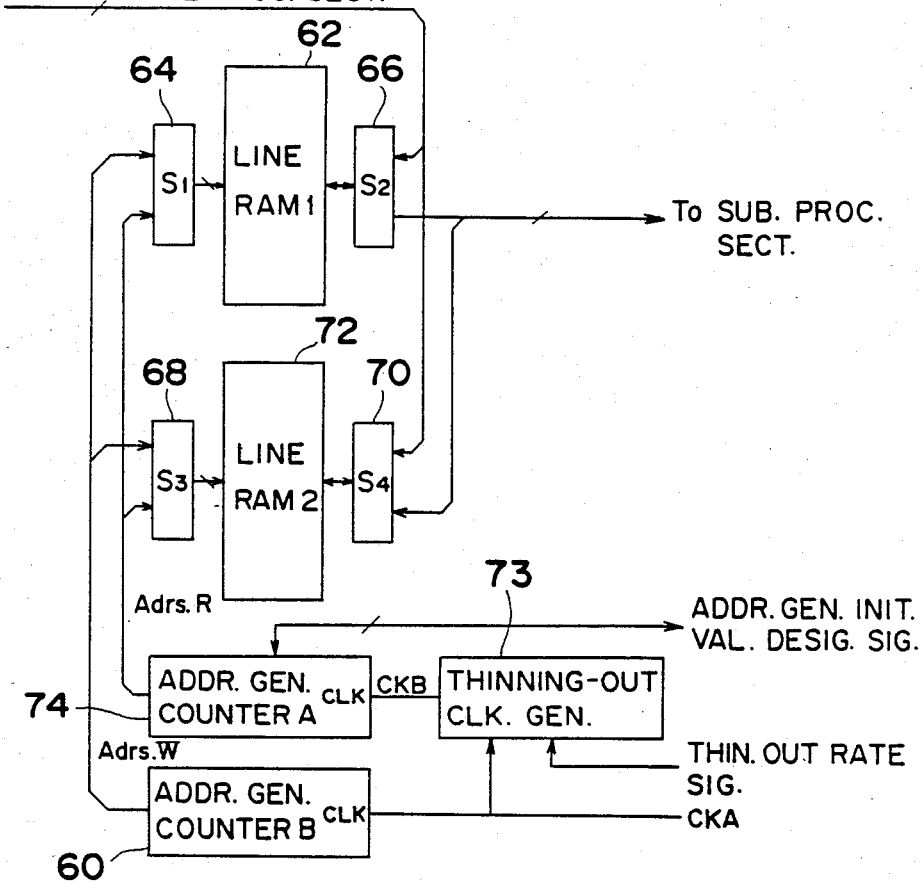
FIG. 6 is a block diagram showing an electrical magnification varying section for the arrangement of FIG. 5.

FIG. 6 shows a block diagram for one example of the electrical magnification varying section 44 for electrically varying magnification of the image as referred to above.

The electrical magnification varying section 44 generally includes a first address generating counter or writing address generating counter 60 and a second address generating counter or reading address generating counter 74 which are connected with a thinning-out clock generating 73 and further coupled with a first line RAM 62 and a second line RAM 72 through selectors (S1, S3) 64 and 68, while said first and second line RAMs 62 and 72 are coupled with the processing section at the previous stage, and also with the processing section at the subsequent stage through selectors (S2, S4) 66 and 70 respectively as shown.

The image signal from the shading correction section 42 is written in the first line RAM 62 through the selector (S2) 66 for one line by an address Adrs W produced by the writing address generating counter 60 through a clock CKA. Subsequently, the selectors (S1 to S4) 64, 66, 68 and 70 are simultaneously changed over, and the signal with respect to the next one line is written in the second line RAM 72. In such a manner, the image signal for one line is alternately written in the pair of line RAMs 62 and 72.

For reading out, the thinning-out clock generating section 73 generates a clock CKB in which the clock CKA is thinned out, in correspondence to a thinning-out rate signal from the CPU 30 and the clock CKA. The reading address generating counter 74 generates an address Adrs R for reading the line RAMs 62 and 72 by an address generation initial value sent from the CPU 30 and the clock CKB. It is to be noted here that both reading and writing of data from and into the memory are effected at the timing of the clock CKA.

Figure 7:
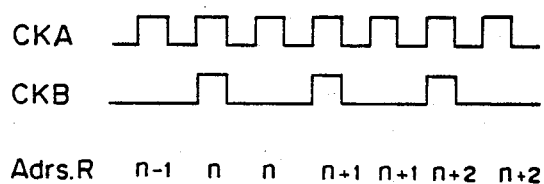
FIG. 7 is a timing-chart for clocks in the electrical magnification varying section.

When the line RAMs 62 and 72 are read by the above address Adrs R, if they are read at the timing of the clock CKA, the same address Adrs R as before is to be read with respect to the thinned-out portion of the clock CKB. By way of example, as shown in FIG. 7, if the thinning-out is effected for every other pulse, each one address is to be read twice, and thus, the image signal magnified by two times is obtained.

Of course, upon magnification by two times, the range which can be read in the line RAMs 62 and 72 will become ½ with respect to the region written in. Therefore, the address generating initial value is set from the CPU 30. For example, if the total addresses are of N pieces as shown in FIG. 8(a), when the address generating initial values are represented by $\phi$, N/4, and N/2 at the magnification by two times, hatched portions in FIGS. 8(b), 8(c) and 8(d) are respectively outputted as the image data of N pieces.

Figure 8:
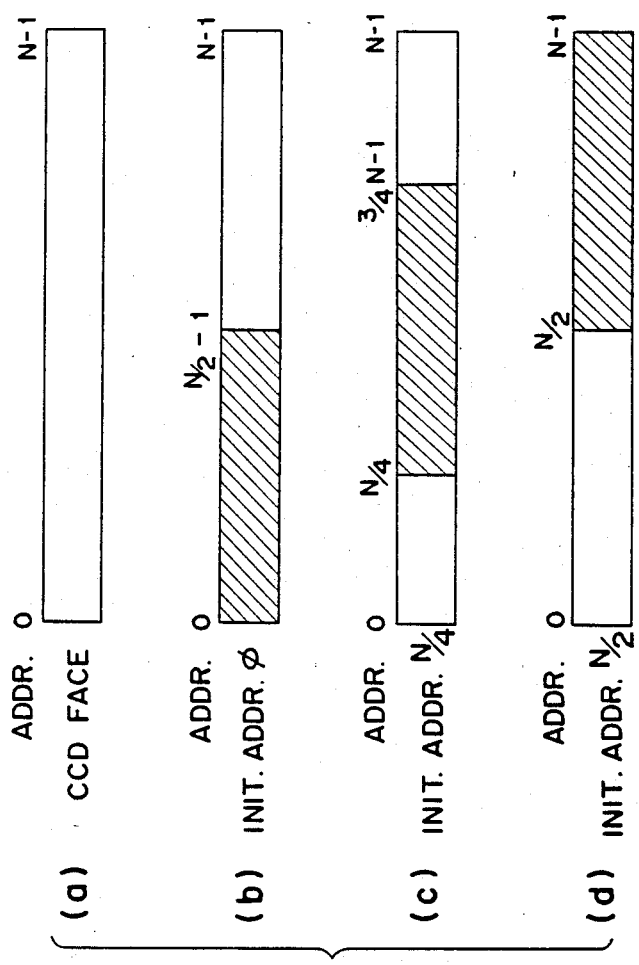
FIGS. 8(a) to 8(d) are diagrams showing reading ranges during two times enlargement.

FIGS. 8(b), 8(c) and 8(d) respectively show cases where the left side half portion, central portion, and right side half portions of the image are to be partially enlarged.

(3) Main flow for variable magnification reading

Figure 9:
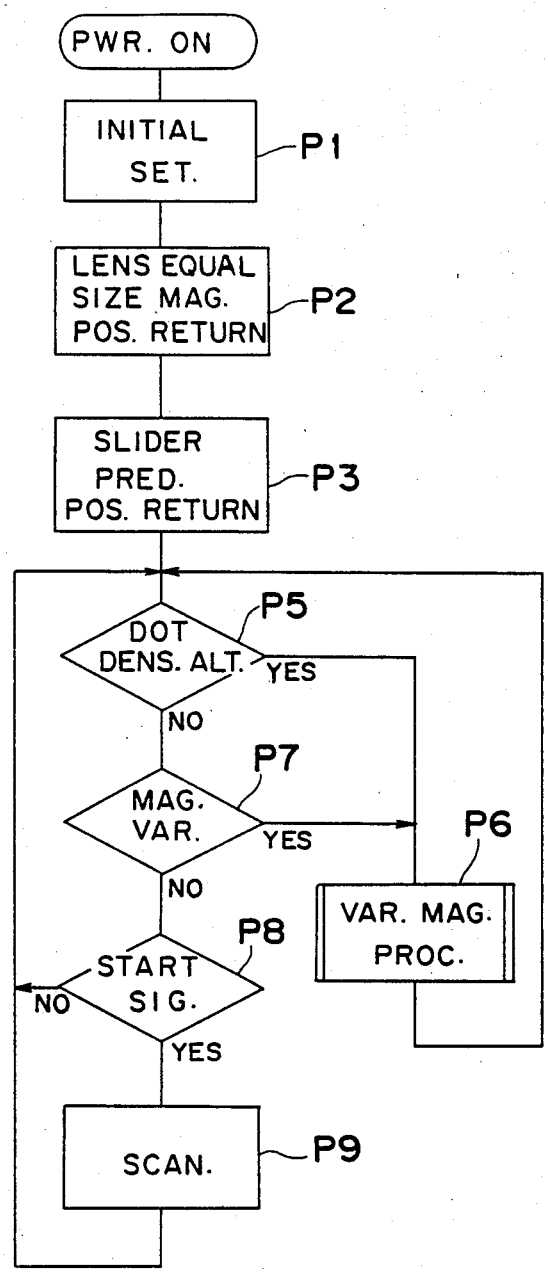
FIG. 9 is a flow-chart for explaining the magnifying reading.

Referring further to a flow-chart of FIG. 9, the flow for magnification reading according to the present invention will be explained hereinafter.

Upon turning on the power source, the initial setting is first effected (step P1). Subsequently, the lens assembly is returned to an initial position (life size or equal size magnification position) by the lens motor M2 (step P2), and the slider is also returned to the predetermined fixed position by the scan motor M1 (step P3).

In the first place, it is checked whether or not the dot density is altered (step P5). If there is any alteration, magnification varying processing is effected (step P6) and the procedure reverts to step P5. Subsequently, it is judged whether or not the magnification is varied (step P7). If there is any variation, the magnification varying processing is effected (step P6), and the procedure is returned to step P5. Although the magnification varying processing will be described in detail in item (4) later, according to the present embodiment, the optical magnification variation is adopted within the range capable of optically varying the magnification, and if the state is outside such range, the optical magnification variation is combined with the electrical magnification variation both for alterations of dot density and magnification.

Thereafter, it is judged whether or not the start signal is inputted (step P8). If it is not inputted, the procedure returns to step P5. As soon as there is an input, scanning for the original document reading is effected at a speed corresponding to the actual magnification (step P9). Upon completion of the scanning, the procedure returns to step P5.

(4) Variable magnification processing

In the case of image enlarging, both the optical magnifying and electrical magnifying are simultaneously used. Although the optical magnifying is superior to the electrical magnifying in that the image quality is not deteriorated, when such optical magnifying is utilized, there may be a case where a region which can not be read occurs on the original document platform, and the electrical magnifying is utilized to read such unreadable region.

The magnifying method as referred to above may be classified into the following two kinds.

(i) If the designated region can not be optically read at the designated magnification, the optical magnifying is used as far as the designated region is covered thereby, and the insufficient portion of the magnification is supplemented by the electrical magnifying.

(ii) In the case where the designated region can not be optically read at the designated magnification, the optical magnifying is set at an equal size magnification, and the electrical enlarging is employed.

In any of the above two practices, if the designated region is within a range which can be covered by the optical enlargement, the optical magnifying is to be preferentially used.

FIG. 1 shows a flow of the variable magnification processing (a) with respect to the magnifying method (i) referred to above.

In the first place, it is checked whether or not the designated magnification E0 is within the range in which the optical magnifying can be effected (step P50). If the result is NO, another treatment such as the combination with the electrical magnifying, etc. is to be effected. Meanwhile, if the designated magnification is within the range capable of effecting the optical magnifying, the maximum magnification E1 capable of reading the entire designated region is calculated (step P51).

If the relation is $E0 \leq E1$ (step P52), the lens assembly 18 is moved up to the position of the designated magnification E0 (step P53).

In the case where the relation is $E0 > E1$ (step P52), the lens assembly 18 is moved up to the position of the magnification E1 at the upper limit capable of covering the designated region (step P54) for effecting the optical magnification. Then, E0/E1 is calculated as the magnification E2 for the electrical magnifying (step P55), and the magnification E2 is set at the electrical magnification varying section 22 (step P56), with an initial address being set to read the designated region (step P57).

Figure 2:
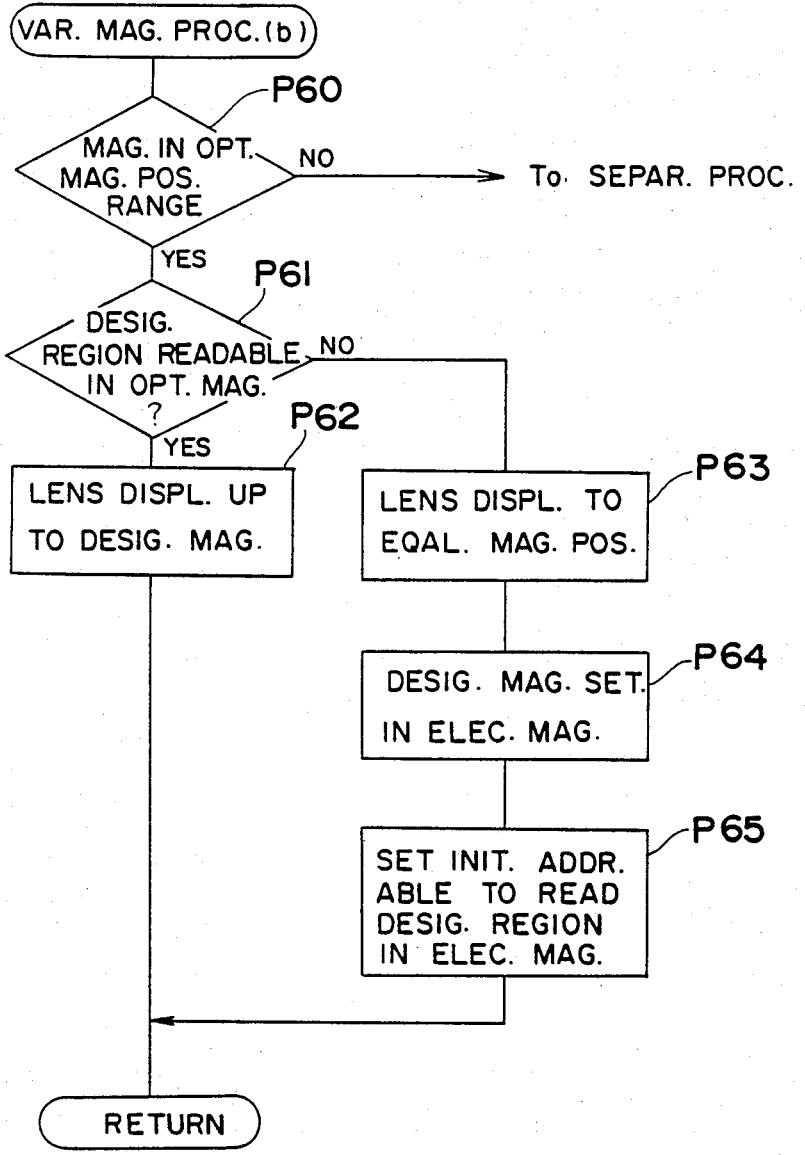
FIG. 2 is a flow-chart showing another embodiment of the variable magnification processing.

FIG. 2 shows a flow for the variable magnification processing (b) with respect to the magnifying method (ii) referred to above.

In the first place, it is checked whether or not the designated magnification is within the range in which the optical magnifying can be effected (step P60). If the result is NO, another treatment such as the combination of the optical magnifying (the upper limit magnification) with the electrical magnifying, etc. is to be effected. Meanwhile, if the designated magnification is within the range capable of effecting the optical magnifying, it is subsequently judged whether or not the designated region can be read during the optical magnifying (step P61). If the result is YES, the lens assembly 18 is displaced up to the position corresponding to the designated magnification (step P62).

If it is impossible to read the designated region during the optical magnifying, the lens assembly 18 is displaced to the equal size magnification position (step P63). Then, the designated magnification (thinning-out ratio signal) is applied to the electrical magnification varying section 44 (step P64), and the address generation initial value for reading the designated region is set (step P65).

Figure 10:
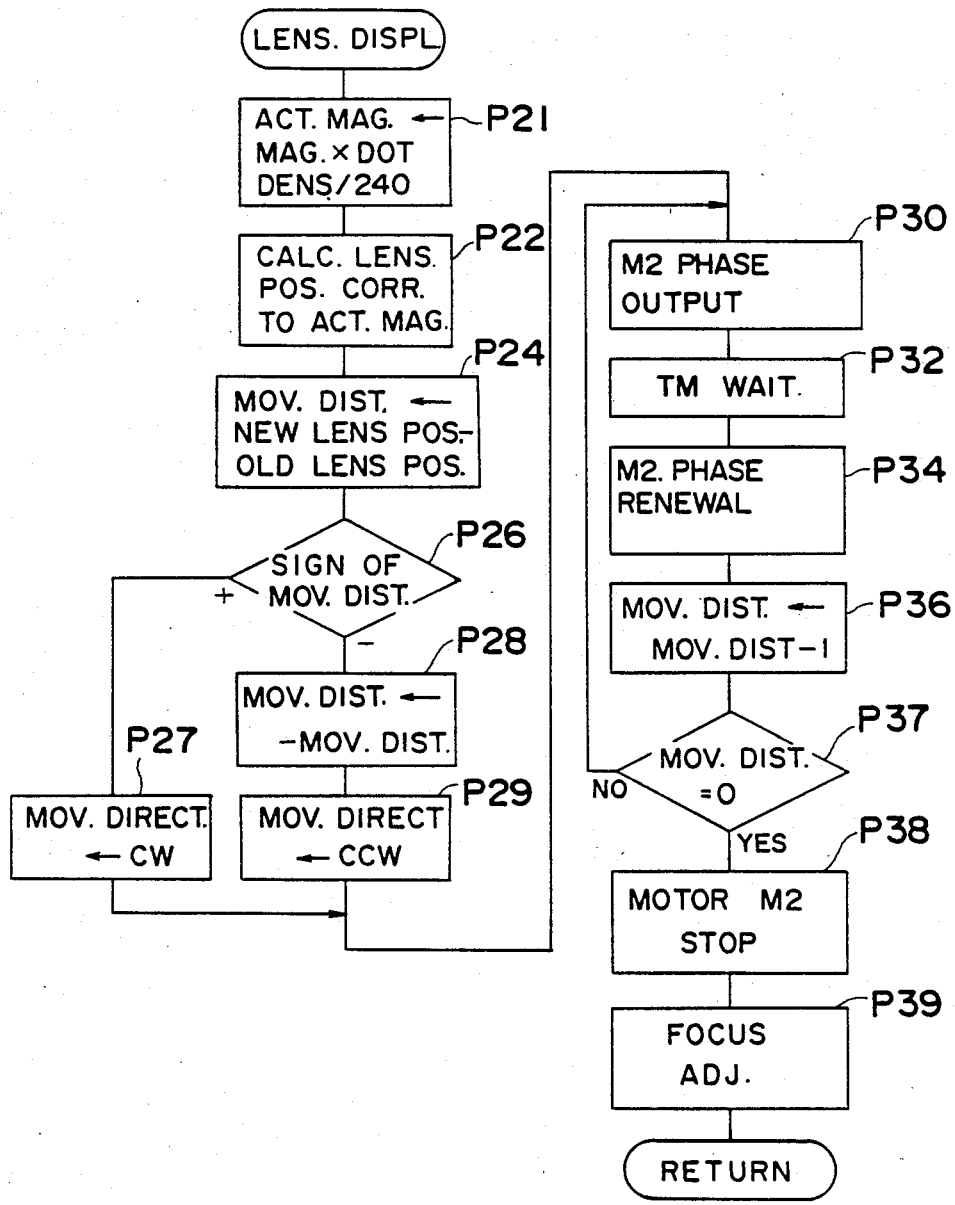
FIG. 10 is a flow-chart for the lens displacement.
Figure 11A:
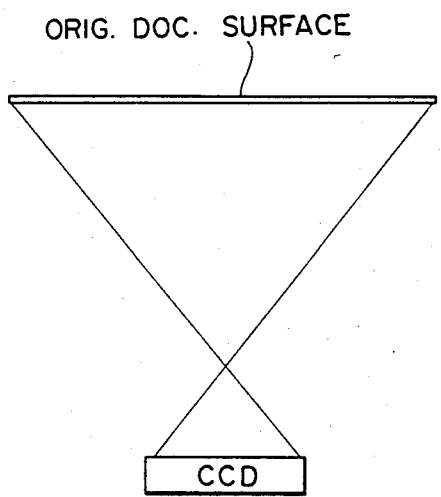
FIGS. 11(a) and 11(b) are diagrams respectively showing relation between the surface of an original document and that of an image pickup element (CCD) (already referred to).
Figure 11B:
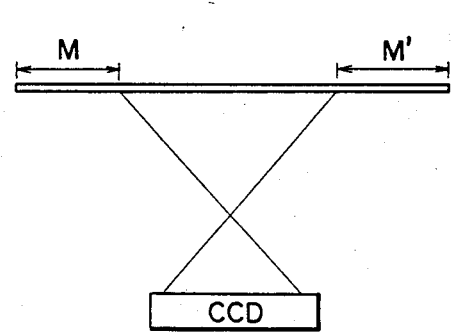

Subsequently, the lens displacement (steps P53, P54, P62 and P63) will be described in detail with reference to the flow-chart of FIG. 10.

In the first place, actual magnification within the reading device is calculated by the inputted magnification and dot density of the printer (step P21). Here, 240 dots/inch are set as the fundamental magnification. Accordingly, the equal size magnification at 240 dots/inch is the actual size magnification at one time, and the equal size magnification at 480 dots/inch becomes the actual size magnification at two times. Then, the position of the lens assembly 18 corresponding to the actual magnification is calculated (step P22). Subsequently, the difference between the present lens position and the new lens position obtained at step P22 is set to be the distance of displacement of the lens assembly 18, with the displacement corresponding to alteration by one phase of the lens motor being set as a unit (step P24). Thereafter, it is checked whether the displaced distance is positive or negative (step P26). If said distance is positive, the direction of displacement is represented by CW which is the displacing direction in the case of "positive" (step P27). Meanwhile, if the displaced distance is negative, the symbol for said distance is made positive (step P28), and the moving direction is represented by CCW which is in the opposite direction to CW (step P29).

Then, present phase is applied to the lens motor M2 (step P30). After waiting for a predetermined period of time (step P32), the phase is renewed (step P34). 1 is subtracted from the displaced distance (step P36), and it is checked whether or not the displaced distance has become 0 (step P37). If the result is "NO", the procedure returns to step P30 for further displacement. Upon completion of displacement by a predetermined distance, the lens motor M2 is stopped (step P38). Then, the CCD 20 is moved for the focus adjustment by the focus adjusting motor M3 so that the difference of detected density for the white/black pattern of the reference pattern 8 provided on the transparent original document platform becomes the maximum (step P39).

As is clear from the foregoing description, according to the arrangement of the present invention, even the region incapable of reading by the optical magnifying may be read through employment of the electrical magnifying. Thus, since it is not necessary for the operator to pay attention to the setting of an original document, operability is remarkably improved.

Owing to the fact that the optical magnifying is effectively utilized up to the limit which can cover the designated region, deterioration of images may be suppressed to the minimum.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image reading arrangement which comprises:
    an optical projecting mechanism for projecting an image of an original document;
    an image reading device for converting the projected image into an electrical image signal;
    a first magnifying means associated with said optical projecting mechanism for optically enlarging the size of the image to be projected onto said image reading device;
    a second magnifying means including a memory means for temporarily storing an electrical image signal and arranged to electrically enlarge the size of an image by controlling writing and reading of the image signal into and from said memory means;
    a magnification input means for inputting enlarging magnification when the size of the image of the original document is enlarged;
    a region input means for inputting data designating a region on the original document to be read and outputted; and
    a control means for controlling said first and second magnifying means in response to said magnification input means and said region input means; said control means effects the control in such a manner that, when an entire region as designated can not be read if only said first magnifying means is operated at the input magnification, said control means sets magnification to be used in each of said first and second magnifying means so as to cause said first and second magnifying means to function simultaneously.

2. An image reading arrangement as claimed in claim 1, wherein said control means sets a maximum magnification capable of reading the designated region, as the magnification to be set in said first magnifying means, and also, sets a magnification obtained by dividing the input magnification by the maximum magnification, as the magnification to be set in said second magnifying means.

3. An image reading arrangement as claimed in claim 1, wherein said control means sets an equal size magnification, as the magnification to be set in said first magnifying means, and an input magnification, as the magnification to be set in said second magnifying means.

4. An image reading arrangement as claimed in claim 1, wherein said second magnification means further includes a writing address generating section for successively generating address to be written during writing of the image signal into the memory means according to a first clock, a reading address generating section for successively generating address to be read during reading of the image from the memory means, a second clock generating section for forming the second clock according to the rate for electrically enlarging the image from the first clock, and means for effecting the writing and reading of the image signal into and from the memory means according to the first clock.

5. An image reading arrangement as claimed in claim 4, wherein said memory means includes two memories to be used alternately.

* * * * *